US006633845B1

(12) United States Patent
Logan et al.

(10) Patent No.: US 6,633,845 B1
(45) Date of Patent: Oct. 14, 2003

(54) MUSIC SUMMARIZATION SYSTEM AND METHOD

(75) Inventors: Beth Teresa Logan, Somerville, MA (US); Stephen Mingyu Chu, Urbana, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/545,893

(22) Filed: Apr. 7, 2000

(51) Int. Cl.[7] ......................... G10L 15/28; G10L 21/06; G06F 7/00; B41J 3/34; G10G 7/00

(52) U.S. Cl. ....................... 704/255; 704/256; 704/272; 704/235; 700/214; 400/116; 84/609

(58) Field of Search ................................ 704/231–245, 704/251–256, 272; 84/612–616, 609–611, 649; 345/840; 700/214; 400/116

(56) References Cited

U.S. PATENT DOCUMENTS

| | | | | |
|---|---|---|---|---|
| 5,038,658 A | * | 8/1991 | Tsuruta et al. | 84/616 |
| 5,521,324 A | * | 5/1996 | Dannenberg et al. | 84/612 |
| 5,537,488 A | * | 7/1996 | Menon et al. | 704/245 |
| 5,625,749 A | * | 4/1997 | Goldenthal et al. | 704/255 |
| 5,649,234 A | * | 7/1997 | Klappert et al. | 434/307 A |
| 5,703,308 A | * | 12/1997 | Tashiro et al. | 434/307 A |
| 5,918,223 A | | 6/1999 | Blum | 707/1 |
| 5,929,857 A | * | 7/1999 | Dinallo et al. | 345/840 |
| 5,937,384 A | * | 8/1999 | Huang et al. | 704/255 |
| 6,023,673 A | | 2/2000 | Bakis | 704/231 |
| 6,064,958 A | * | 5/2000 | Takahashi et al. | 704/256 |
| 6,195,634 B1 | * | 2/2001 | Dudemaine et al. | 704/243 |
| 6,226,612 B1 | * | 5/2001 | Srenger et al. | 704/242 |
| 6,233,545 B1 | * | 5/2001 | Datig | 704/9 |
| 6,304,674 B1 | * | 10/2001 | Cass et al. | 704/256 |

OTHER PUBLICATIONS

SpeechBot (COMPAQ, Internet product announcement, Dec. 1999).*

K. Martin, Automatic Transcription of Simple Polyphonic Music: Robust Front End Processing, M.I.T. Media Laboratory Perceptual Computing Section Technical Report No. 399, Dec., 1996, pp. 1–11.

J. Foote, “Content–Based Retrieval of Music and Audio”, pp. 1–10.

E. Wold, T. Blum, D. Keislar and J. Wheaton, “Content–Based Classification, Search, and Retrieval of Audio”, IEEE Multimedia 1996, pp. 27–36.

A. Ghias, J. Logan, D. Chamberlin and B. Smith, “Query By Humming—Musical Information Retrieval in an Audio Database”, ACM Multimedia ’95–Electronic Proceedings, Nov. 5–9, 1995, pp. 1–11.

(List continued on next page.)

*Primary Examiner*—Doris H. To
*Assistant Examiner*—Daniel A. Nolan

(57) ABSTRACT

The invention provides a method and apparatus for automatically generating a summary or key phrase for a song. The song, or a portion thereof, is digitized and converted into a sequence of feature vectors, such mel-frequency cepstral coefficients (MFCCs). The feature vectors are then processed in order decipher the song’s structure. Those sections that correspond to different structural elements are then marked with corresponding labels. Once the song is labeled, various heuristics are applied to select a key phrase corresponding to the song’s summary. For example, the system may identify the label that appears most frequently within the song, and then select the longest duration of that label as the summary.

28 Claims, 7 Drawing Sheets

OTHER PUBLICATIONS

R. McNab, L. Smith, I. Witten, C. Henderson and S. Cunningham, "Towards the Digital Music Library: Tune Retrieval from Acoustic Input", ACM 1996, pp. 11–18.

M. Brand, "Structure learning in conditional probability models via an entropic prior and parameter extinction", Oct. 19, 1997 revised Aug. 24, 1998, pp. 1–27.

M. Brand, "Pattern discovery via entropy minimization", Mar. 8, 1998 revised Oct. 29, 1998, pp. 1–10.

K. Kashino and H. Murase, "Music Recognition Using Note Transition Context", pp. 1–4.

M. Siegler, U. Jain, B. Raj and R. Stern, "Automatic Segmentation, Classification and Clustering of Broadcast News Audio", pp. 1–3.

S. Young, D. Kershaw, J. Odell, D. Ollason, V. Valtchev and P. Woodland, "The HTK Book", Version 2.2, Dec. 1995, pp. 3–20, 67–76, 113–153 and Table of Contents.

Y. Zhuang, Y. Rui, T. Huang and S. Mehrota, "Adaptive Key Frame Extraction Using Unsupervised Clustering", pp. 1–5.

K. Martin, E. Scheirer and B. Vercoe, "Music Content Analysis through Models of Audition", ACM Multimedia '98 Workshop on Content Processing of Music for Multimedia Applications, Sep. 12, 1998.

J. Brown, "Musical fundamental frequency tracking using a pattern recognition method", J. Accoust. Soc. Am., Sep., 1992, pp. 1394–1402.

J. Brown and B. Zhang, Musical frequency tracking using the methods of conventional and "narrowed" autocorrelation, J. Accoust. Soc. Am., May 1991, pp. 2346–2355.

* cited by examiner

MUSIC SUMMARIZATION SYSTEM AND METHOD

BACKGROUND OF THE INVENTION

1. Field of the Invention

This invention relates generally to multimedia applications, databases and search engines, and more specifically, to a computer-based system and method for automatically generating a summary of a song.

2. Background Information

Governmental, commercial and educational enterprises often utilize database systems to store information. Much of this information is often in text format, and can thus be easily searched for key phrases or for specified search strings. Due to recent advances in both storage capacity and processing power, many database systems now store audio files in addition to the more conventional text-based files. For example, digital juke boxes that can store hundreds, if not thousands, of songs have been developed. A user can select any of these songs for downloading and/or playback. Several commercial entities have also begun selling music, such as CD-ROMs, over the Internet. These entities allow users to search for, select and purchase the CD-ROMs using a browser application, such as Internet Explorer from Microsoft Corp. of Redmond, Wash. or Netscape Navigator from America Online, Inc. of Dulles, Va.

Since there is currently no mechanism for efficiently searching the content of audio files, system administrators typically append conventional, text-based database fields, such as title, author, date, format, keywords, etc. to the audio files. These conventional database fields can then be searched textually by a user to locate specific audio files. For Internet or on-line music systems, the generation of such database fields for each available CD-ROM and/or song can be time-consuming and expensive. It is also subject to data entry and other errors.

For users who do not know the precise title or the artist of the song they are interested in, such text-based search techniques are of limited value. Additionally, a search of database fields for a given search string may identify a number of corresponding songs, even though the user may only be looking for one specific song. In this case, the user may have to listen to substantial portions of the songs to identify the specific song he or she is interested in. Users may also wish to identify the CD-ROM on which a particular song is located. Again, the user may have to listen to significant portions of each song on each CD-ROM in order to locate the particular song that he or she wants. Rather than force users to listen to the first few minutes of each song, a short segment of each song or CD-ROM could be manually extracted and made available to the user for review. The selection of such song segments, however, would be highly subjective and again would be time-consuming and expensive to produce.

Systems have been proposed that allow a user to search audio files by humming or whistling a portion of the song he or she is interested in. These systems process this user input and return the matching song(s). Viable commercial systems employing such melodic query techniques, however, have yet to be demonstrated.

SUMMARY OF THE INVENTION

One aspect of the present invention is the recognition that many songs, especially songs in the rock and popular ("pop") genres, have specific structures, including repeating phrases or structural elements, such as the chorus or refrain, that are relatively short in duration. These repeating phrases, moreover, are often well known, and can be used to quickly identify specific songs. That is, a user can identify a song just by hearing this repeating phrase or element. Nonetheless, these repeating phrases often do not occur at the beginning of a song. Instead, the first occurrence of such a repeating phrase may not take place for some time, and the most memorable example of the phrase may be its third or fourth occurrence within the song. The present invention relates to a system for analyzing songs and identifying a relatively short, identifiable "key phrase", such as a repeating phrase that may be used as a summary for the song. This key phrase or summary may then be used as an index to the song.

According to the invention, the song, or a portion thereof, is digitized and converted into a sequence of feature vectors. In the illustrative embodiment, the feature vectors correspond to mel-frequency cepstral coefficients (MFCCs). The feature vectors are then processed in a novel manner in order decipher the song's structure. Those sections that correspond to different structural elements can then be marked with identifying labels. Once the song is labeled, various rules or heuristics are applied to select a key phrase for the song. For example, the system may determine which label appears most frequently within the song, and then select at least some portion of the longest occurrence of that label as the summary.

The deciphering of a song's structure may be accomplished by dividing the song into fixed-length segments, analyzing the feature vectors of the corresponding segments and combining like segments into clusters by applying a distortion algorithm. Alternatively, the system may employ a Hidden Markov Model (HMM) approach in which a specific number of HMM states are selected so as to correspond to the song's labels. After training the HMM, the song is analyzed and an optimization technique is used to determine the most likely HMM state for each frame of the song.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
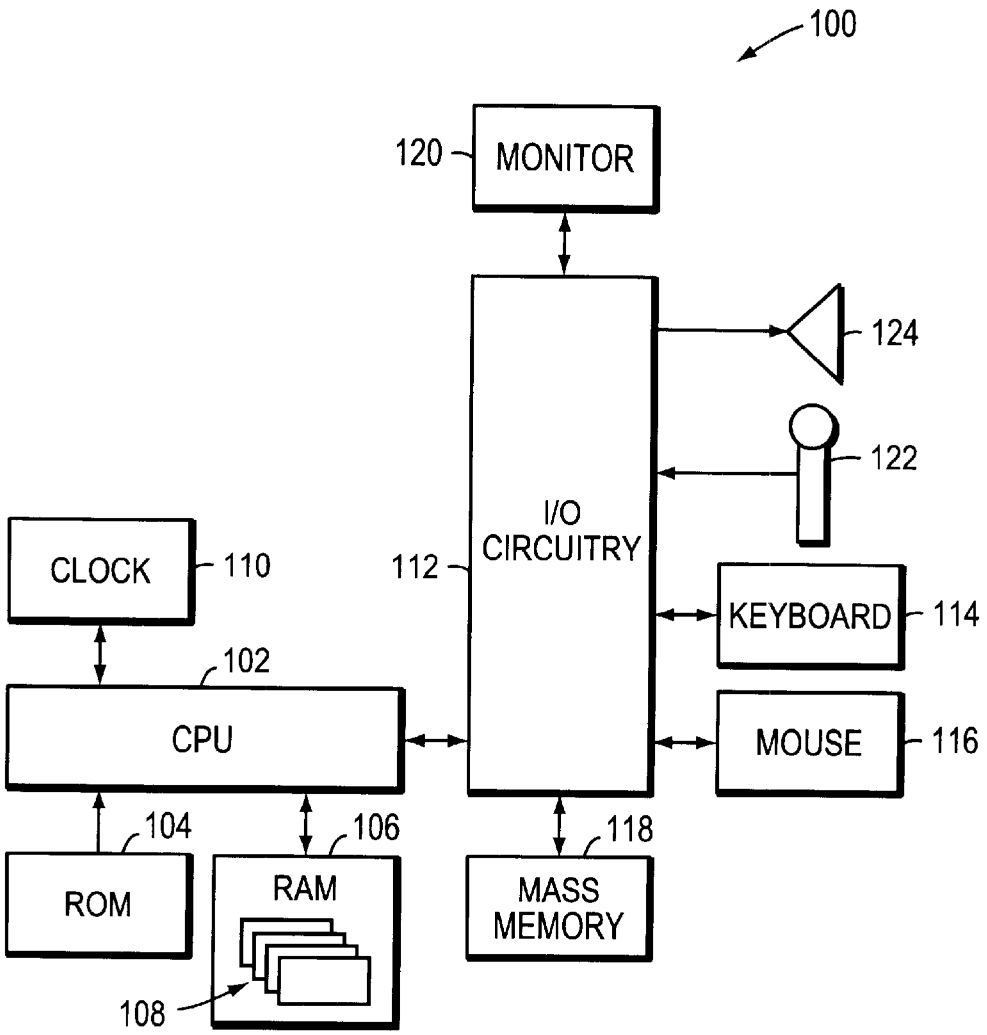
FIG. 1 is highly schematic block diagram of a computer system for use with the present invention.

FIG. 1 shows a computer system 100 having a central processing unit (CPU) 102 that is coupled to a read only memory (ROM) 104 for receiving one or more instruction sets and to a random access memory (RAM) 106 having a plurality of buffers 108 for temporarily storing and retrieving information. A clock 110 is also coupled to the CPU 102 for providing clock or timing signals or pulses thereto. The computer system 100 further includes input/output (I/O) circuitry 112 that interfaces between the CPU 102 and one or more peripheral devices, such as a keyboard 114, a mouse 116, a mass memory device 118 (e.g., a hard drive), and a monitor 120 having a display screen (not shown). The computer system 100 may also include a microphone 122 and a speaker 124 that are similarly coupled via I/O circuitry 112 to the CPU 102. A user may control or interact with the computer system 100 through keyboard 114 and/or mouse 116. Those skilled in the art will understand that the computer system 100 includes one or more bus structures for interconnecting its various components.

A suitable computer system 100 for use with the present invention includes UNIX workstations, such as those sold by Sun Microsystems, Inc. of Palo Alto, Calif. or Hewlett Packard Company of Palo Alto, Calif., or personal computers sold by Compaq Computer Corporation of Houston, Tex. or International Business Machines Corporation (IBM) of Armonk, N.Y. All of these computers have resident thereon, and are controlled and coordinated by, operating system software, such as UNIX, Microsoft Windows NT or IBM OS2.

Figure 2:
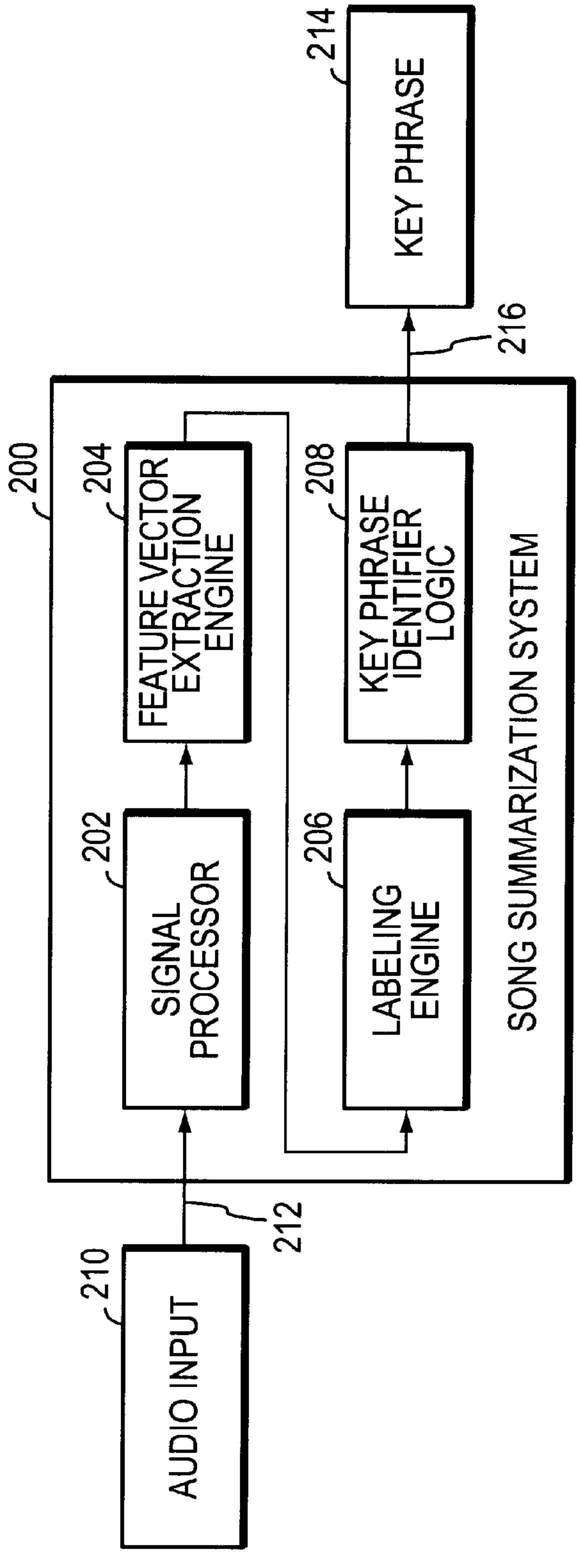
FIG. 2 is a highly schematic block diagram of a song summarization system in accordance with the present invention.

FIG. 2 illustrates generally a song summarization system 200 in accordance with the present invention. The system 200 includes a signal processor 202 that is coupled to a feature vector extraction engine 204. The vector extraction engine 204 is coupled to a labeling engine 206, which, in turn, is coupled to key phrase identifier logic 208. An audio input 210, which is preferably a song or a portion thereof, is provided to the system 200, as illustrated by arrow 212. As described herein, the song is then processed by the various components of the system 200 in order to identify a summary or key phrase 214 that is then output by the system 200 as illustrated by arrow 216. For example, the key phrase 214 may be played back through speaker 124 (FIG. 1) and/or stored in RAM 106 or mass memory 118.

The song summarization system 200, including its subcomponents 202–208, may comprise one or more software programs, such as software modules or libraries, pertaining to the methods described herein, that are resident on a computer readable media, such as mass memory 118 (FIG. 1) or RAM 106, and may be executed by one or more processing elements, such as CPU 102. Other computer readable media, such as floppy disks and CD-ROMs, may also be used to store the program instructions. Song summarization system 200 and/or one or more of its discrete components 202–208 may alternatively be implemented in hardware through a plurality of registers and combinational logic configured to produce sequential logic circuits and cooperating state machines. Those skilled in the art will recognize that various combinations of hardware and software elements may be employed.

Each component 202–208 is configured to perform some particular function on the audio input 210. The signal processor 202, for example, converts the audio input 210 into a form suitable for processing by the remaining components of the song summarization system 200. As described above, the audio input 210 is preferably a song, such as a song from the rock or pop genres. The audio input 210 may be received by the system 100 (FIG. 1) through microphone 122. In the preferred embodiment, the audio input 210 is only the first half of the song being summarized. That is, the key phrase is selected from the first half of the song.

The signal processor 102, among other things, performs an analog-to-digital (A/D) conversion of the song signal (e.g., 16,000 samples per second and 8 bits per sample). This may be performed, for example, by a printed circuit board having a CODEC chip providing 8 bit $\mu$-law compressed samples. Such circuit boards are commercially available from several vendors including Dialogic Corporation of Parsippany, N.J. The signal is then preferably divided or sliced into discrete frames. Each frame may be on the order of 25 milliseconds (ms) in duration and the frames preferably overlap each other by 12.5 ms so that all of the audio input 210 is represented in one or more frames. The signal processor 202 then passes the digitized data corresponding to these frames to the feature vector extraction engine 204.

It should be understood that the song being summarized may be received by computer 100 (FIG. 1) in digitized format and stored at mass memory 118.

Figure 3:
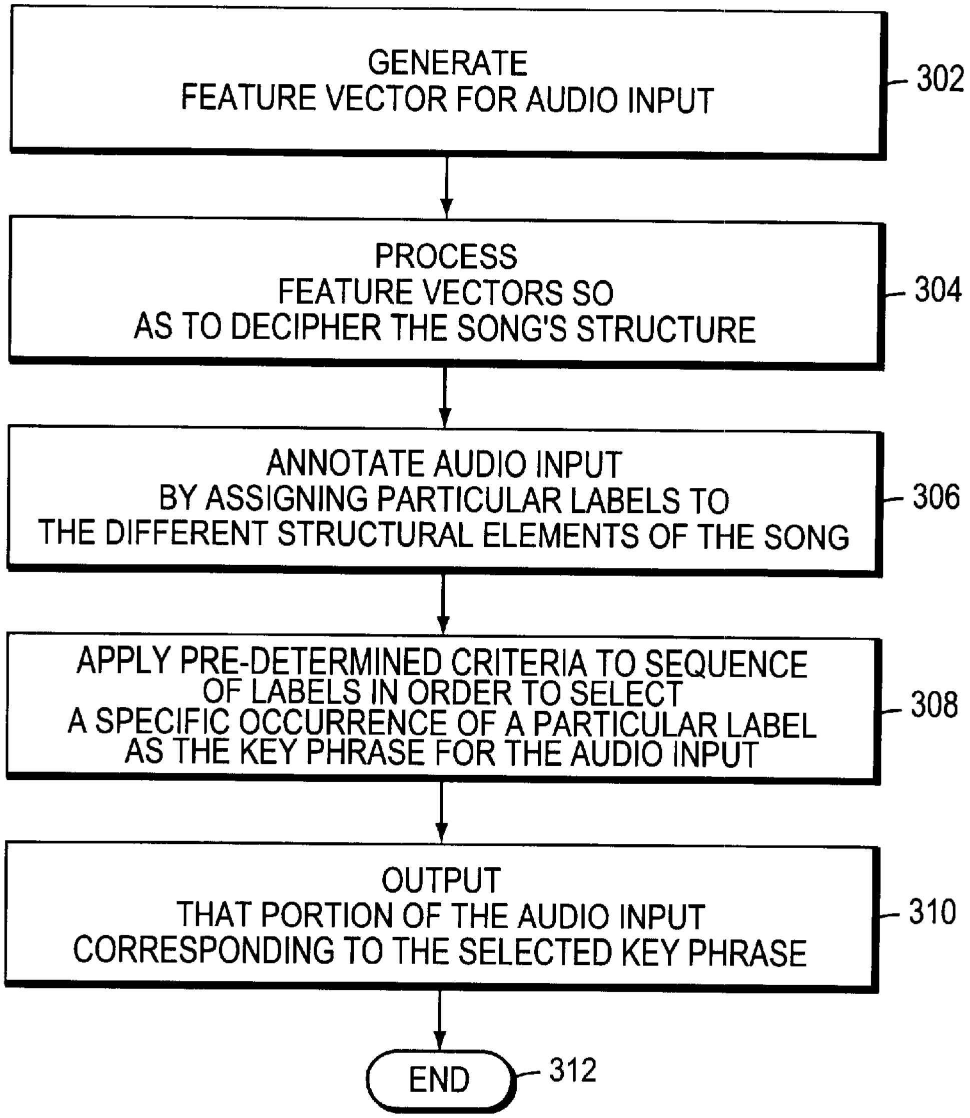
FIGS. 3, 4 and 6 are flow diagrams of preferred methods of the present invention.

FIG. 3 is a flow diagram illustrating the preferred steps of the present invention. First, engine 204 of the system 200 generates a feature vector for each frame of the audio input 210, as indicated at step 302. In the illustrative embodiment, each feature vector is a plurality of mel-frequency cepstral coefficients (MFCCs). A Mel is a psycho-acoustical unit of frequency well known to those skilled in the art. There are several techniques for generating feature vectors comprising MFCCs. For example, the extraction engine 204 may first perform a windowing function, e.g., apply a Hamming window, on each frame. A Hamming window essentially tapers the respective signal to zero at both the beginning and end of the frame, thereby minimizing any discontinuities. Engine 204 may also apply some type of preemphasis on the signal to reduce the amplitude range of the frequency spectrum. In the illustrative embodiment, a preemphasis coefficient of 0.97 is utilized. The time varying data for each frame is then subject to a Fast Fourier Transform function ("FFT") to obtain a frequency domain signal. The log amplitude of the frequency signal may be warped to the Mel frequency scale and the warped frequency function subject to a second FFT to obtain the parameter set of MFCCs.

More specifically, the frequency domain signal for each frame may be run through a set of triangular filters. In the preferred embodiment, an approximation to the Mel frequency scaling is used. In particular, 40 triangular filters that range between 133 Hz and 6855 Hz are used. The first 13 filters are linearly spaced, while the next 27 are log-spaced. Attached as Appendix A hereto is a description of the triangular filter parameters utilized in the illustrative embodiment. The resulting 40 approximately mel-frequency spaced components for each frame are then subject to a discrete cosine transform (DCT) function to obtain the MFCCs. Preferably, the bottom 13 MFCCs are then passed by the extraction engine 204 to the labeling engine 206 for additional analysis and processing. In other words, the output of the extraction engine 204 is a sequence of vectors, each of n-dimensions (e.g., 13). Each vector, moreover, represents a frame of the audio input 210. The feature vectors are received at the labeling engine 206 which utilizes the vectors to decipher the song's structure, as indicated at step 304.

It should be understood that the audio input 210 may be subject to additional processing to reduce the computation power and storage space needed to analyze the respective signal. It should be further understood that other feature vector parameters, besides MFCCs, could be utilized. For example, feature vector extraction engine 204 could be configured to extract spectrum, log spectrum, or autoregressive parameters from the song signal for use in generating the feature vectors.

Clustering Technique

Figure 4:
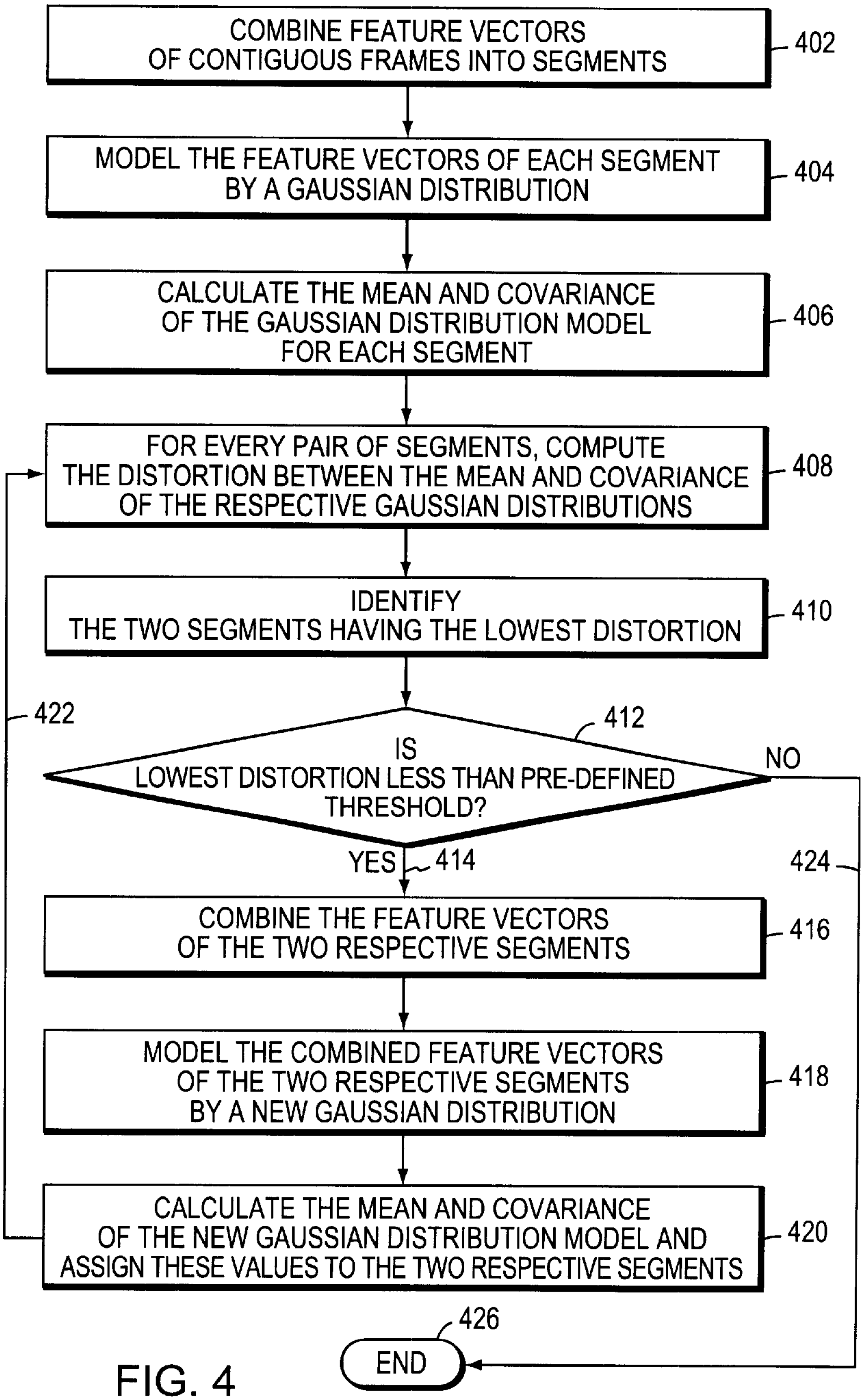

We turn now to FIG. 4 which is a flow diagram of the preferred method utilized by the labeling engine 206 (FIG. 2) to decipher the song's structure. This method may be referred to as the "clustering" technique. First, the feature vectors corresponding to the sequence of frames are organized into segments, as indicated at step 402. For example, contiguous sequences of feature vectors may be combined into corresponding segments that are each of 1 second duration. Assuming the frames are 25 ms long and overlap each other by 12.5 ms, as described above, there will be approximately 80 feature vectors per segment. Obviously, segments of sizes other than 1 second may be utilized. Next, the feature vectors for each segment are modeled by a Gaussian Distribution, as indicated at step 404. The mean and covariance of the Gaussian Distribution for each segment is then calculated, as illustrated at block 406. Suitable methods for modeling vectors by a Gaussian Distribution, and calculating the corresponding mean and covariance parameters is described in J. Deller, J. Hansen, and J. Proakis *Discrete-Time Processing of Speech Signals* (IEEE Press Classic Reissue 1993) at pp. 36–41.

It should be understood that the modeling of feature vectors by Gaussian Distributions is effected by calculating the corresponding means and covariances, and thus the step of modeling is just a logical, not an actual, processing step.

For every pair of segments, the labeling engine 206 then computes the distortion between the mean and covariance of the respective Gaussian Distributions, as indicated at block 408. Distortion, sometimes called distance measure, refers to a measurement of spectral dissimilarity. As explained herein, the distortion between various segments of the song is measured in order to identify those segments that can be considered to be the same and those that are dissimilar. Dissimilar segments are then assigned different labels. A suitable distance measure for computing the distortion between segments is a modified cross-entropy or Kullback-Leibler (KL) distance measure, which is described in M. Siegler et al. "Automatic segmentation, classification and clustering of broadcast news data" *DARPA Speech Recognition Workshop*, pp. 97–99 (1997), which is hereby incorporated by reference in its entirety. The Kullback-Leibler distance measure is modified in order to make it symmetric. More specifically, the labeling engine 206 (FIG. 2) uses the equation:

$$KL2(A;B)=KL(A;B)+KL(B;A) \quad (1)$$

where, A and B are the two distributions being compared and KL2 is the modified KL distance and $$KL(A;B)=E[\log(pdf(A))-\log(pdf(B))] \quad (2)$$

where pdf stands for the probability density function. Assuming the pdfs for A and B are Gaussian, then equation (1) becomes:

$$KL2(A;B)=\Sigma A/\Sigma B+\Sigma B/\Sigma A+(\mu A-\mu B)^2\cdot(1/\Sigma A+1/\Sigma B) \quad (3)$$

where $\Sigma$ denotes variance and $\mu$ denotes mean.

Should a given segment lack sufficient data points for the above algorithm, such as when very short segments are used, the Mahalanobis distance algorithm is preferably used. The Mahalanobis distance algorithm can be written as follows for the case when distribution B models too few data points:

$$M(A;B)=(\mu A-\mu B)^2/\Sigma A$$

Upon computing the distortion for each pair of segments, the labeling engine 206 identifies the two segments having the lowest distortion, as indicated at block 410, and determines whether this lowest distortion is below a predetermined threshold, as indicated by decision block 412. In the preferred embodiment, this threshold may range from 0.2 to 1.0 and is preferably on the order of 0.4. Alternatively, the threshold may be based upon the ratio of maximum to minimum distortion for all current segments. If the minimum distortion is less than the threshold, then the feature vectors for the two respective segments are combined as indicated by Yes arrow 414 leading from decision block 412 to block 416. In other words, the two segments are combined to form a "cluster" whose set of feature vectors is the combination of feature vectors from the two constituent segments.

This combined set of feature vectors is then modeled by a new Gaussian Distribution as indicated at block 418. Furthermore, the corresponding mean and covariance are calculated for this new Gaussian Distribution, and these values are assigned to the cluster (i.e., the two constituent segments), as indicated at block 420. As shown by arrow 422 leading from block 420, processing then returns to step 408 at which point labeling engine 206 computes the distortion between every pair of segments. Since the two segments that were combined to form the cluster have the same mean and covariance, labeling engine 206 only needs to compute the distortion between one of the two constituent segments and the remaining segments. Furthermore, since none of the other mean or covariance values have changed, the only computations that are necessary are the distortions between the newly formed cluster (i.e., one of the two constituent segments) and the remaining segments.

Again, the distortions are examined and the two segments (one of which may now correspond to the previously formed cluster) having the lowest distortion are identified, as indicated by block 410. Assuming the lowest identified distortion is less than the threshold, then the feature vectors for the two segments (and/or clusters) are combined, as indicated by blocks 412 and 416. A new Gaussian Distribution model is then generated and new mean and covariance parameters or values are calculated, as indicated by blocks 418 and 420. The distortion between the remaining segments is then re-computed, again as indicated at block 408, and the lowest computed distortion is identified and compared to the threshold, as indicated by blocks 410–412. As shown, this process of combining segments (or clusters) whose distortion is below the pre-defined threshold into new clusters is repeated until the distortion between all of the remaining segments and/or clusters is above the threshold.

When the lowest distortion between the current set of clusters and any remaining segments (i.e., those segments that were not combined to form any of the clusters) is above the threshold, then processing is complete as indicated by the No arrow 424 leading from decision block 412 to end block 426. By identifying those segments of the audio input 210 (e.g., the first half of the song being sumrnmarized) that share similar cepstral features, the system 200 has been able to automatically decipher the song's structure.

It should be recognized that both segments and clusters are simply collections of frames. For segments, which represent the starting point of the clustering technique, the frames are contiguous. For clusters, which represent groups of segments sharing similar cepstral features, the frames are generally not contiguous.

Labeling engine 206 then preferably generates a separate label for each cluster and remaining segments. The labels may simply be a sequence of numbers, e.g., 0, 1, 2, 3, etc., depending on the final number of clusters and remaining segments.

Returning to FIG. 3, upon obtaining the labels, the labeling engine 206 preferably uses them to annotate the audio input as indicated at block 306, preferably on a frame-by-frame basis. More specifically, all of the frames that belong to the same cluster or to the same remaining segment are marked with the label for that cluster or segment, e.g., 0, 1, 2, 3, etc. All of the frames corresponding the same structural elements of the song (i.e., frames having similar cepstral features as determined by the distortion analysis described above) are thus marked with the same label.

Figure 5:
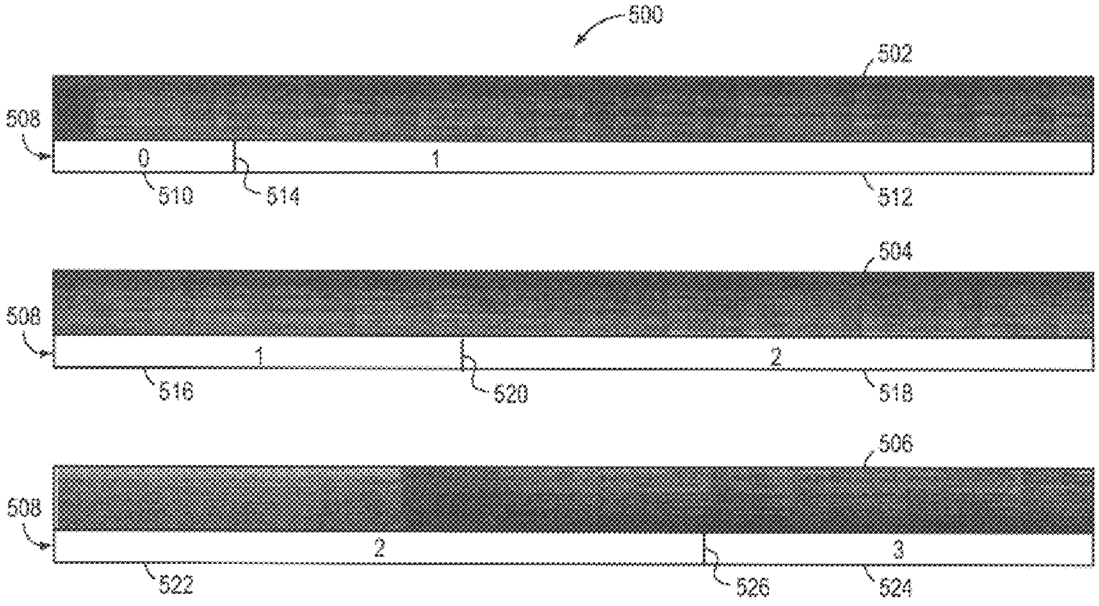
FIG. 5 is a partial illustration of a song spectrum that has been analyzed and labeled in accordance with the present invention.

FIG. 5 is a partial illustration of a song spectrum 500 that has been analyzed and labeled in accordance with the invention. The song spectrum 500 has been divided into three sections 502, 504 and 506 because of its length. Associated with each section is an associated label space 508, which may be located below the song spectrum as shown. The label space 508 contains the labels that have been annotated to the respective song. It may also illustrate the demarcation points or lines separating adjacent labels. For example, a first portion 510 of song segment 502 is annotated with label "0", while a second portion 512 is annotated with label "1". A demarcation line 514 shows where, in song segment 502, the transition from "0" to "1" occurs.

Song segment 504 similarly has a first portion 516 annotated with label "1". First portion 516 is actually just a continuation of second portion 512 of song segment 502. A second portion 518 of song segment 504 is annotated with label "2" following demarcation line 520. Song segment 506 has a first portion 522, which is simply a continuation of the previous portion 518, and is thus also annotated with label "2". Song segment 506 further includes a second portion 524 annotated with label "3" following demarcation line 526.

After it has been labeled, the audio input is passed to the key phrase identifier logic 208 for additional processing. The key phrase identifier logic 208 preferably examines the labeled audio input and applies some predetermined heuristics to select a key phrase or summary, as indicated by block 308. For example, the key phrase identifier logic 208 may join consecutive frames having the same label into song portions. Logic 208 then identifies the label that occurs most frequently within the audio input. Logic 208 then selects, as the key phrase for the respective song, the longest duration song portion that is marked with this most frequently occurring label. For example, referring to song spectrum 500 (FIG. 5), suppose that label "2" is the most frequently occurring label in the song. Furthermore, suppose that the occurrence of label "2" between song segments 504 and 506 (i.e., portions 518 and 522) is the longest duration of label "2". If so, at least some part (e.g., the first ten seconds) of this section of the song (i.e., portions 518 and 522) is preferably selected as the key phrase 214 for the respective song.

The key phrase 214 is then output by the system 200, as indicated at block 310. In particular, the key phrase 214 may be played back through speaker 124. It may also be appended to the respective song file and stored at mass memory 118. To search specific audio files, a user may simply play-back these automatically generated summaries or key phrases for the audio files stored at mass memory 118. At this point, processing by system 200 is complete, as indicated by end block 312.

Those skilled in the art will recognize that the key phrase identifier logic 208 may apply many alternative heuristics or rules to identify the song summary from the labeled frames. For example, instead of choosing the summary from the longest example of the most frequent label, it may be taken from the first occurrence of the most frequent label. Longer or shorter summaries may also be selected.

Hidden Markov Model Technique

Other solutions besides clustering may also be applied to decipher the structure of the song being summarized. For example, the labeling engine 206 may alternatively be configured to use a Hidden Markov Model (HMM) technique to decipher the structure of the respective song so that its various elements may be annotated with labels. Basically, an HMM, having a plurality of states, is established for each song to be summarized. The HMM is preferably ergodic, meaning that the states are fully connected (i.e., any state may be reached directly from any other state, including itself), and all states are emitting.

Each HMM state is intended to correspond to a different structural element of the song that may then be marked with the same label. A series of transition probabilities are also defined for the HMM. The transition probabilities relate to the probability of transitioning between any two HMM states (or transiting back to the same HMM state). In the illustrative embodiment, each HMM state is modeled by a Gaussian Distribution, and is thus characterized by its mean and covariance values. The transition probabilities and Gaussian mean and covariance values are referred to as HMM parameters. Given these parameters, a dynamic programming algorithm is used to find the most likely state sequence through the HMM for the given song, thereby identifying the song's structure. All frames associated with the same HMM state are then assigned the same label. Once the song has been labeled, the heuristics discussed above may be applied to select a key phrase or summary.

Figure 6:
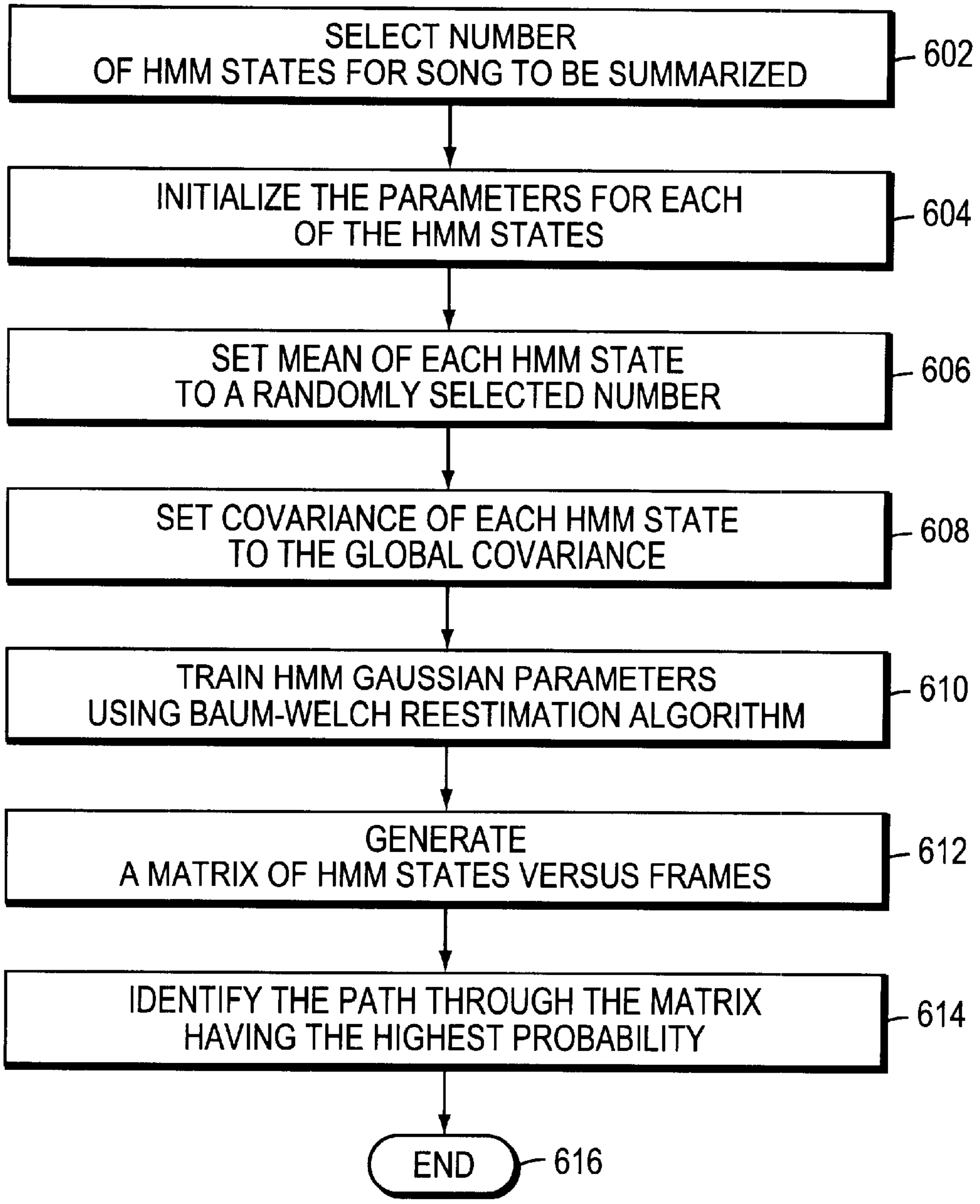

FIG. 6 is a flow diagram illustrating the preferred steps for applying the HMM technique to decipher a song's structure. First, as indicated at step 602, the number of HMM states for use in analyzing the respective song is selected. The number of HMM states for summarizing the first half of a rock or pop song is preferably within the range of 3–15. A preferred number of HMM states is 10. The number of HMM states for each song could be dynamically chosen using some HMM structure learning technique, such as the technique described in M. Brand *Pattern discovery via entropy minimization, Proceedings of Uncertainty* '99 (1999) pp. 12–21.

The parameters of the HMM states are then initialized as indicated at block 604. For example, all possible state transitions are permitted (i.e., the HMM is ergodic) and all transitions are equally probable. Assuming each HMM state is modeled by a Gaussian Distribution, the mean for each HMM state is set to a randomly assigned number, as indicated at block 606. The covariance for each HMM state is set to the global covariance, i.e., the covariance calculated using all of the feature vectors of the respective song, as indicated at block 608. In other words, each feature vector is modeled by a Gaussian Distribution, and the covariance for each modeled feature vector is computed.

Using the Baum-Welch re-estimation algorithm, the HMM parameters (i.e., means, covariances and transition probabilities) are re-estimated, as indicated at block 610. As a result, the parameter values having the maximum likelihood are determined for each HMM state. The HMM is now trained and can be used to decipher the structure of the song. As shown, the HMN was trained with the feature vectors of the song itself. A suitable description of the Baum-Welch re-estimation algorithm, which is well known to those skilled in the art, can be found in S. Young, D. Kershaw, J. Odell, D. Ollason, V. Valtchev and P. Woodland *The HTK Book*, copr. 1995–1999 Entropic Ltd. (Version 2.2 January 1999) at pp. 8–11, as well as in L. Rabiner and B. Juang *Fundamentals of Speech Recognition* (Prentice Hall 1993) at p. 342.

Figure 7:
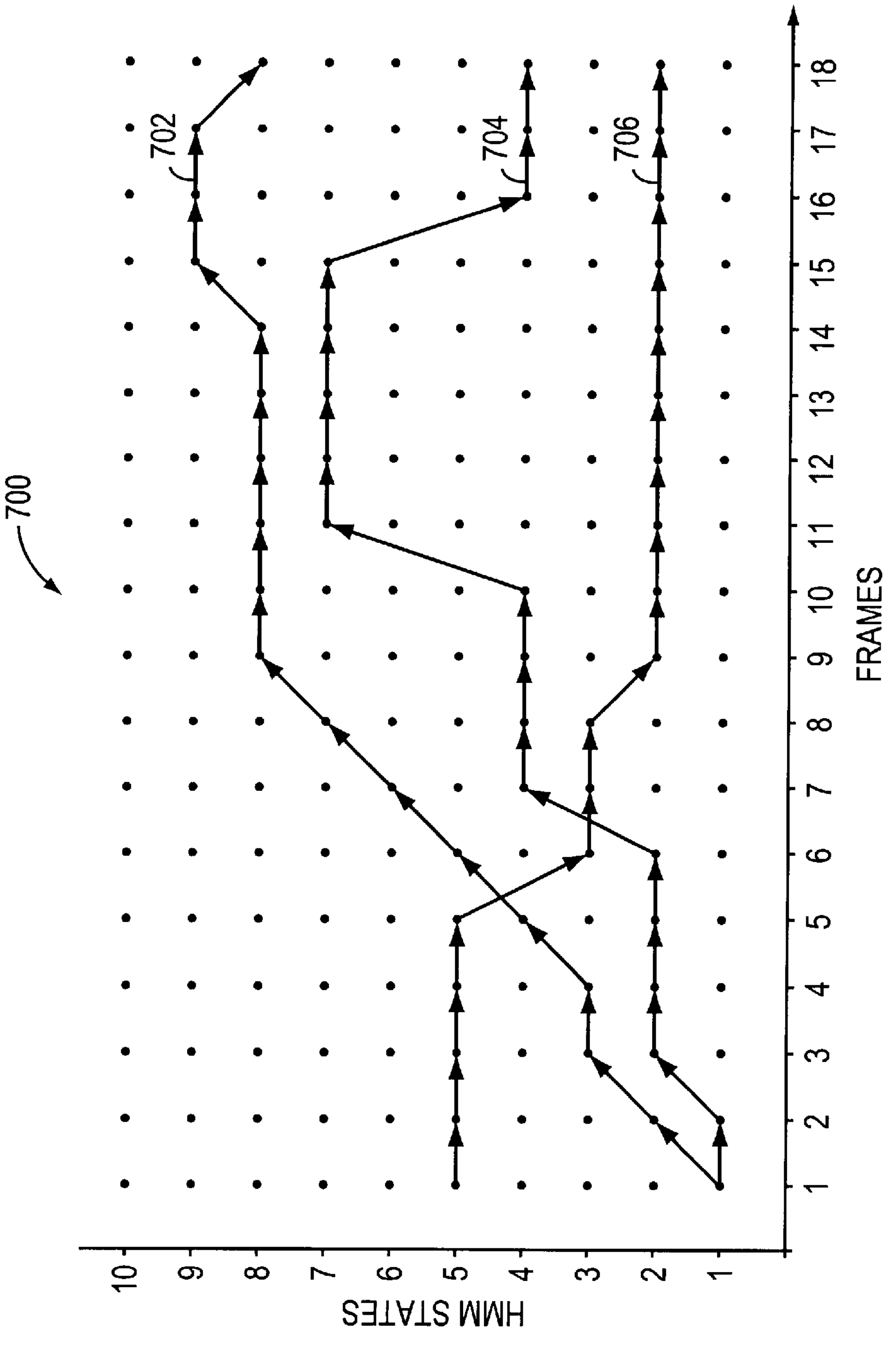
FIG. 7 is an illustration of a node matrix for use in deciphering a song's structure.

To decipher the song's structure, labeling engine 206 preferably generates a matrix of HMM states versus frames, as indicated at block 612. FIG. 7 is a preferred embodiment of such a matrix, which is designated generally as 700. As shown, the matrix 700 comprises a plurality of nodes. As described below, each path through the matrix, i.e., the sequence of nodes moving sequentially from frame 1 to the last frame (only 18 frames are shown for clarity), has a corresponding probability. Labeling engine 206 (FIG. 2) determines the probability for each path and selects the path with the highest probability, as indicated at step 614. In the illustrative embodiment, the labeling engine 206 utilizes a dynamic programming algorithm, such as the Viterbi algorithm, to find the path through the matrix 700 having the highest probability. A description of Viterbi decoding or alignment can be found in the *HTK Book* at pp. 11–13, and in *Fundamentals of Speech Recognition* at pp. 339–342.

In particular, as described above, each HMM state has an associated mean and covariance value (i.e., the HMM state's observation values). The feature vector for each frame similarly has an associated mean and covariance value. Thus, a probability can be determined for how closely a given feature vector matches an HMM state. In other words, each frame has a certain probability that it is associated with each HMM state. In addition, there is a probability associated with each transition from one HMM state to another or for staying in the same HMM state. The labeling engine 206 may thus determine the overall probability for each possible path through the matrix 700 starting from the first frame (i.e., frame 1 of FIG. 7) and moving sequentially through all the remaining frames.

Movement through the matrix 700 is subject to certain constraints. For example, each path must include a single occurrence of each frame and must proceed sequentially from frame 1 to the last frame. In other words, no frame may be skipped and no frame can be associated with more than one HMM state. Thus, vertical and right-to-left moves are prohibited. The only permissible moves are horizontal and diagonal left-to-right. For purposes of clarity, only three paths 702, 704 and 706 are illustrated in matrix 700. As explained above, an overall probability is associated with each path through the matrix, including paths 702, 704 and 706. Suppose labeling engine 206 determines that path 704 represents the highest probability path through matrix 700. By finding the highest probability path through the matrix 700, labeling engine 206 has effectively deciphered the song's structure. In particular, the song's structure corresponds to the sequence of HMM states along the highest probability path. This completes processing as indicated by end block 616. Labeling engine 206 then uses the identified HMM states of this path 704 to mark the song with labels, as indicated at step 306 (FIG. 3). In particular, with reference to FIG. 7, engine 206 annotates frames 1 and 2 with label "1", frames 3–6 with label "2", frames 7–10 with label "4", frames 11–15 with label "7", frames 16–18 with label "4", and so on.

Once the song has been labeled, it is passed to the key phrase identifier logic 208 (FIG. 2), which applies the desired heuristics for identifying and selecting the key phrase 214 as indicated at step 308 (FIG. 3) described above. For example, logic 208 may identify and select the longest duration song portion that is marked with the most frequently occurring label. It should be understood that once the probability for a given path with matrix 700 below a threshold, labeling engine 206 may drop that path from further consideration to conserve processor and memory resources.

The foregoing description has been directed to specific embodiments of this invention. It will be apparent, however, that other variations and modifications may be made to the described embodiments, with the attainment of some or all of their advantages. For example, the methods of the present invention could be applied to more complex musical compositions, such as classical music or opera. Here, the threshold for distinguishing between clusters and the number of HMM states may need to be adjusted. Therefore, it is an object of the appended claims to cover all such variations and modifications as come within the true spirit and scope of the invention.

APPENDIX

| Filter Number | Low Frequency | Mid Frequency | High Frequency |
|---|---|---|---|
| 1 | 133.333 | 200.00 | 266.667 |
| 2 | 200.000 | 266.667 | 333.333 |
| 3 | 266.667 | 333.333 | 400.000 |
| 4 | 333.333 | 400.000 | 466.667 |
| 5 | 400.000 | 466.667 | 533.333 |
| 6 | 466.667 | 533.333 | 600.000 |
| 7 | 533.333 | 600.000 | 666.667 |
| 8 | 600.000 | 666.667 | 733.333 |
| 9 | 666.667 | 733.333 | 800.000 |
| 10 | 733.333 | 800.000 | 866.667 |
| 11 | 800.000 | 866.667 | 933.333 |
| 12 | 866.667 | 933.333 | 1000.000 |
| 13 | 933.333 | 1000.000 | 1071.170 |
| 14 | 1000.000 | 1071.170 | 1147.406 |
| 15 | 1071.170 | 1147.406 | 1229.067 |
| 16 | 1147.406 | 1229.067 | 1316.540 |
| 17 | 1229.067 | 1316.540 | 1410.239 |
| 18 | 1316.540 | 1410.239 | 1510.606 |
| 19 | 1410.239 | 1510.606 | 1618.117 |
| 20 | 1510.606 | 1618.117 | 1733.278 |
| 21 | 1618.117 | 1733.278 | 1856.636 |
| 22 | 1733.278 | 1856.636 | 1988.774 |
| 23 | 1856.636 | 1988.774 | 2130.316 |
| 24 | 1988.774 | 2130.316 | 2281.931 |
| 25 | 2130.316 | 2281.931 | 2444.337 |
| 26 | 2281.931 | 2444.337 | 2618.301 |
| 27 | 2444.337 | 2618.301 | 2804.646 |
| 28 | 2618.301 | 2804.646 | 3004.254 |
| 29 | 2804.646 | 3004.254 | 3218.068 |
| 30 | 3004.254 | 3218.068 | 3447.099 |
| 31 | 3218.068 | 3447.099 | 3692.430 |
| 32 | 3447.099 | 3692.430 | 3955.221 |
| 33 | 3692.430 | 3955.221 | 4236.716 |
| 34 | 3955.221 | 4236.716 | 4538.244 |
| 35 | 4236.716 | 4538.244 | 4861.232 |
| 36 | 4538.244 | 4861.232 | 5207.208 |
| 37 | 4861.232 | 5207.208 | 5577.807 |
| 38 | 5207.208 | 5577.807 | 5974.781 |
| 39 | 5577.807 | 5974.781 | 6400.008 |
| 40 | 5974.781 | 6400.008 | 6855.499 |

What is claimed is:

1. A method for producing a key phrase for a song having words and music and a plurality of elements organized into a song structure, the method comprising the steps of:

dividing at least a portion of the song into a plurality of frames;

generating a feature vector for each frame, each feature vector having a plurality of parameters whose values are characteristic of that portion of the song contained within the respective frame;

processing the feature vectors of each frame so as to identify the song's structure;

marking those feature vectors associated with different structural elements of the song with different labels; and applying one or more predetermined rules to the marked set of feature vectors in order to select a single occurrence of a chosen label as the key phrase of the song.

2. The method of claim 1 wherein the key phrase is appended to the song.

3. The method of claim 2 wherein the chosen label corresponds to the most frequently occurring label.

4. A method for producing a key phrase for a song having a plurality of elements organized into a song structure, the method comprising the steps of:

dividing at least a portion of the song into a plurality of frames;

generating a feature vector for each frame, each feature vector having a plurality of parameters whose values are characteristic of that portion of the song contained within the respective frame;

processing the feature vectors of each frame so as to identify the song's structure;

marking those feature vectors associated with different structural elements of the song with different labels; and applying one or more predetermined rules to the marked set of feature vectors in order to select a single occurrence of a chosen label as the key phrase of the song, wherein the key phrase is appended to the song, the chosen label corresponds to the most frequently occurring label, and the single occurrence corresponds to at least a portion of the longest duration of the chosen label.

5. The method of claim 1 wherein the parameters of the feature vectors are mel-frequency cepstral coefficients (MFCCs).

6. The method of claim 5 wherein the processing step comprises the steps of:

combining the feature vectors of a predetermined number of contiguous frames into corresponding segments;

calculating a mean and a covariance for a Gaussian Distribution model of each segment;

comparing the respective means and covariances of the segments; and grouping together those segments whose respective means and covariances are similar, thereby revealing the song's structure.

7. The method of claim 6 wherein the comparing step comprises the steps of:

computing the distortion between the means and covariances of the segments;

identifying the two feature vectors whose distortion is the lowest;

if the lowest distortion is less than a pre-defined threshold, combining the feature vectors of the two segments into a cluster;

calculating a mean and covariance for the cluster based on the feature vectors from the two segments; and repeating the steps of computing, identifying, combining and calculating until the distortion between all remaining clusters and segments, if any, is equal to or greater than the pre-defined threshold.

8. The method of claim 7 wherein the distortion computation is based upon the Kullback-Leibler (KL) distance measure, modified so as to be symmetric.

9. The method of claim 8 wherein the frames of all segments combined to form a single cluster are considered to be part of the same structural element of the song.

10. The method of claim 7 wherein the frames of all segments combined to form a single cluster are considered to be part of the same structural element of the song.

11. The method of claim 1 wherein the chosen label corresponds to the most frequently occurring label.

12. The method of claim 5 wherein the processing step comprises the steps of:

selecting a number of connected Hidden Markov Model (HMM) states to model the song being summarized;

training the HMM with at least a portion of the song being summarized; and applying the trained HMM to the song portion so as to associate each frame with a single HMM state.

13. The method of claim 12 wherein each HMM state has a corresponding set of parameters, and the step of training comprises the steps of:

initializing the parameters of each HMM state to predetermined values; and optimizing the HMM state parameters by using the Baum-Welch re-estimation algorithm.

14. The method of claim 13 wherein each HMM state is modeled by a Gaussian Distribution, and the step of initializing comprises the steps of:

setting a mean of each HMM state to a randomly selected value; and setting a covariance of each HMM state to a global covariance based on a covariance associated with each of the feature vectors.

15. The Method of claim 14 wherein the step of applying comprises the steps of:

building a matrix of HMM states versus frames; and identifying a single path through the matrix having a highest probability.

16. The method of claim 15 wherein the highest probability path is identified using the Viterbi decoding algorithm.

17. The method of claim 12 wherein the frames associated with the same HMM state are considered to be part of the same structural element of the song.

18. The method of claim 12 wherein the step of applying comprises the steps of:

building a matrix of HMM states versus frames; and identifying a single path through the matrix having a highest probability.

19. A system for producing a key phrase for a song having words and music and a plurality of elements organized into a song structure, the system comprising:

a signal processor configured to receive a signal that corresponds to at least a portion of the song, and for dividing the song signal into a plurality of frames;

a feature vector extraction engine coupled to the signal processor, the extraction engine configured to generate a feature vector for each frame, each feature vector having a plurality of parameters whose values are characteristic of that portion of the song signal contained within respective frame;

a labeling engine coupled to the feature vector extraction engine, the labeling engine configured to process the feature vectors so as to identify the song's structure, and to mark those feature vectors associated with different structural elements of the song with different labels; and a key phrase identifier logic coupled to the labeling engine, the identifier logic configured to apply one or more predetermined rules to the marked set of feature vectors in order to select a single occurrence of a chosen label as the key phrase of the song.

20. The system of claim 19 wherein the key phrase is appended to the song.

21. The system of claim 19 wherein the chosen label corresponds to the most frequently occurring label.

22. A computer readable medium containing program instructions for producing a key phrase for a song having words and music and a plurality of elements organized into a song structure, the executable program instructions comprising program instructions for:

dividing at least a portion of the song into a plurality of frames;

generating a feature vector for each frame, each feature vector having a plurality of parameters whose values are characteristic of that portion of the song contained within the respective frame;

processing the feature vectors of each frame so as to identify the song's structure;

marking those feature vectors associated with different structural elements of the song with different labels; and applying one or more predetermined rules to the marked set of feature vectors in order to select a single occurrence of a chosen label as the key phrase of the song.

23. The computer readable medium of claim 22 wherein the program instructions for processing comprise program instructions for:

combining the feature vectors of a predetermined number of contiguous frames into corresponding segments;

calculating a mean and a covariance for a Gaussian Distribution model of each segment;

comparing the respective means and covariances of the segments; and grouping together those segments whose respective means and covariances are similar, thereby revealing the song's structure.

24. The computer readable medium of claim 22 wherein the program instructions for processing comprise program instructions for:

selecting a number of connected Hidden Markov Model (HMM) states to model the song being summarized;

training the HMM with at least a portion of the song being summarized; and applying the trained HMM to the song portion so as to associate each frame with a single HMM state.

25. A method for producing a key phrase for a musical piece having a plurality of elements organized into a structure, the method comprising the steps of:

dividing at least a portion of the musical piece into a plurality of frames;

generating a feature vector for each frame, each feature vector having a plurality of parameters whose values are characteristic of that portion of the musical piece contained within the respective frame;

processing the feature vectors of each frame so as to identify the musical piece's structure;

marking those feature vectors associated with different structural elements of the musical piece with different labels; and applying one or more predetermined rules to the marked set of feature vectors in order to select a single occurrence of a chosen label as the key phrase of the musical piece.

26. The method of claim 25 wherein the musical piece is one of a song having words and music and an instrumental having music but being free of words.

27. A system for producing a key phrase for a musical piece having a plurality of elements organized into a structure, the system comprising:

a signal processor configured to receive a signal that corresponds to at least a portion of the musical piece, and for dividing the musical piece into a plurality of frames;

a feature vector extraction engine coupled to the signal processor, the extraction engine configured to generate a feature vector for each frame, each feature vector having a plurality of parameters whose values are characteristic of that portion of the musical piece signal contained within respective frame;

a labeling engine coupled to the feature vector extraction engine, the labeling engine configured to process the feature vectors so as to identify the musical piece's structure, and to mark those feature vectors associated with different structural elements of the musical piece with different labels; and a key phrase identifier logic coupled to the labeling engine, the identifier logic configured to apply one or more predetermined rules to the marked set of feature vectors in order to select a single occurrence of a chosen label as the key phrase of the musical piece.

28. The system of claim 27 wherein the musical piece is one of a song having words and music and an instrumental having music but being free of words.

* * * * *